US005644119A

United States Patent [19]

Padula et al.

[11] Patent Number: 5,644,119

[45] Date of Patent: Jul. 1, 1997

[54] CUSTOMER INTERFACE FOR DRIVER

[75] Inventors: Joseph Anthony Padula, Vancouver; Owen Ricardo Williams, New Westminster; Mark Frederick Abraham, Vancouver, all of Canada; William Dale Ramsey, Jr., Kingwood, Tex.

[73] Assignee: Shell Oil Company, Houston, Tex.

[21] Appl. No.: 461,275

[22] Filed: Jun. 5, 1995

[51] Int. Cl.[6] .................... G06K 15/00

[52] U.S. Cl. .................... 235/384; 235/383; 902/33

[58] Field of Search .................... 235/383, 384; 902/33; 186/41, 53

[56] References Cited

U.S. PATENT DOCUMENTS

| | | | |
|---|---|---|---|
| 2,435,755 | 2/1948 | Schimpff | 186/53 |
| 4,084,149 | 4/1978 | Driver et al. | 902/33 |
| 4,735,289 | 4/1988 | Kenyon | 186/53 |
| 4,881,581 | 11/1989 | Hollerback | 141/113 |
| 5,027,282 | 6/1991 | Hollidge | 364/479 |
| 5,072,380 | 12/1991 | Randelman et al. | 235/384 |
| 5,310,999 | 5/1994 | Claus et al. | 235/384 |
| 5,383,500 | 1/1995 | Dwars et al. | 141/98 |
| 5,412,191 | 5/1995 | Baitz et al. | 235/383 |

FOREIGN PATENT DOCUMENTS

| | | |
|---|---|---|
| 42 42 243 A1 | 6/1994 | Germany . |
| WO94/03391 | 2/1994 | WIPO . |
| WO95/32919 | 12/1995 | WIPO . |

OTHER PUBLICATIONS

"Lawrence Livermore Laboratory: Hoping to Make Highways Safer," *Technology Transfer Business*, Fall 1994, 1 page.

Dawn Stover, "Radar on a Chip, 101 Uses in Your Life" *Popular Science*, Mar. 1995, 6 pages.

Cheryl Ajluni, "Low-Cost Wideband Spread-Spectrum Device Promises to Revolutionize Radar Proximity Sensors," *Electronic Design*, Jul. 25, 1994, 2 pages.

*Primary Examiner*—Donald T. Hajec
*Assistant Examiner*—Karl Frech
*Attorney, Agent, or Firm*—Del S. Christensen

[57] ABSTRACT

A customer interface is provided, the customer interface comprising: a customer interface panel; a device to determine a desirable height for the customer to access the interface panel from that particular vehicle; a device to position the customer interface panel at the desirable height for the customer in the particular vehicle; and a device to position the customer interface panel within a predetermined lateral distance from the vehicle. This customer interface is preferably provided as a component of an automated refuelling system with a radio frequency transponder provided with the vehicle, the transponder capable of identifying to the system information adequate to identify the make, model, and year of the vehicle.

11 Claims, 3 Drawing Sheets

CUSTOMER INTERFACE FOR DRIVER

FIELD OF INVENTION

This invention relates to an apparatus for interfacing with a driver sitting in a motor vehicle.

BACKGROUND TO THE INVENTION

Numerous apparatuses have been proposed and used for customer interfaces where the customer is sitting in a motor vehicle. For example, drive-in bank tellers have been common for many decades. These drive-in teller booths have been often replaced with automatic teller machines to which a driver may pull-up and transact business through the driver side window of a vehicle. These apparatuses are placed at a height that can be reached by the majority of the vehicles on the road, but this height is generally either too high or too low for any particular vehicle. It is not uncommon for the driver to have to exit the vehicle to utilize such an interface, thus defeating much of the advantage of a customer interface that is intended to be accessed from a vehicle.

Stationary arrangements for customer interfaces are disclosed in, for example, U.S. Pat. Nos. 5,027,282 and 4,881,581.

German Patent Application DE 42 42 243 A1 discloses a customer interface for a automated refuelling apparatus that is movable in one direction. Movement is desired in this apparatus because the vehicle is spotted by placing a front tire into a grove, and because the distance from the front tire to the driver's window can vary considerably between vehicles. The customer interface remains at a fixed height, and is not moved toward the vehicle at all. Besides for customer convenience and comfort, it would be particularly desirable to provide an interface that can be consistently be accessed without having to open the driver's door because it would be desirable in an automated refuelling system to have an intruder interruption wherein if a person is detected outside of the vehicle, the automated refuelling is interrupted. It would be unacceptable for such an interruption to result if it were necessary to open the driver's door to access the customer interface.

Further, fixed customer interfaces can only be as close to the vehicle as the driver is capable of pulling up to the interface. A curb is typically provided to prevent a driver from scrapping a protruding review mirror on the interface, resulting in a significant lateral distance between the interface and the driver.

A "customer interface" as referred to herein is meant to mean a panel that is intended to be interfaced with a person sitting in a motor vehicle. Such interface may include, individually or in combination, speakers, microphones, visual displays, card readers, push buttons, shutdown switches, and the like.

It would therefore be desirable to have a customer interface that could be more conveniently accessed by a driver.

It is therefore an object of the present invention to provide a customer interface for a customer seated in a vehicle wherein an interface panel is moved laterally toward a driver's window of the vehicle and vertically to an appropriate height.

SUMMARY OF THE INVENTION

These and other objects of the present invention are achieved by a customer interface comprising: a customer interface panel; a means to determine a desirable height for the customer to access the interface panel from that particular vehicle; a means to position the customer interface panel at the desirable height for the customer in the particular vehicle; and a means to position the customer interface panel within a predetermined lateral distance from the vehicle.

The customer interface of the present invention is preferably provided as a component of an automated refuelling system because the automated refuelling system may require, for purposes of locating the vehicle's fuel inlet, a means for determining the make and model of vehicle present. With this information available, determining a desirable height for the customer interface can be readily determined, for example, from a look-up table. Providing a customer interface that can be moved in two directions, vertical and lateral, is also preferred in the automated refuelling system of the preferred embodiment of the present invention to eliminate any need for the customer to leave the vehicle to access the customer interface.

The customer interface of the present invention can optionally be movable along a longitudinal axis. This is not required in the preferred embodiment of the present invention because the driver is capable of positioning the vehicle adjacent to the location of the customer interface. Movement along two axis therefore can place the customer interface in an accessible and convenient location.

DETAILED DESCRIPTION OF THE INVENTION

Figure 1:
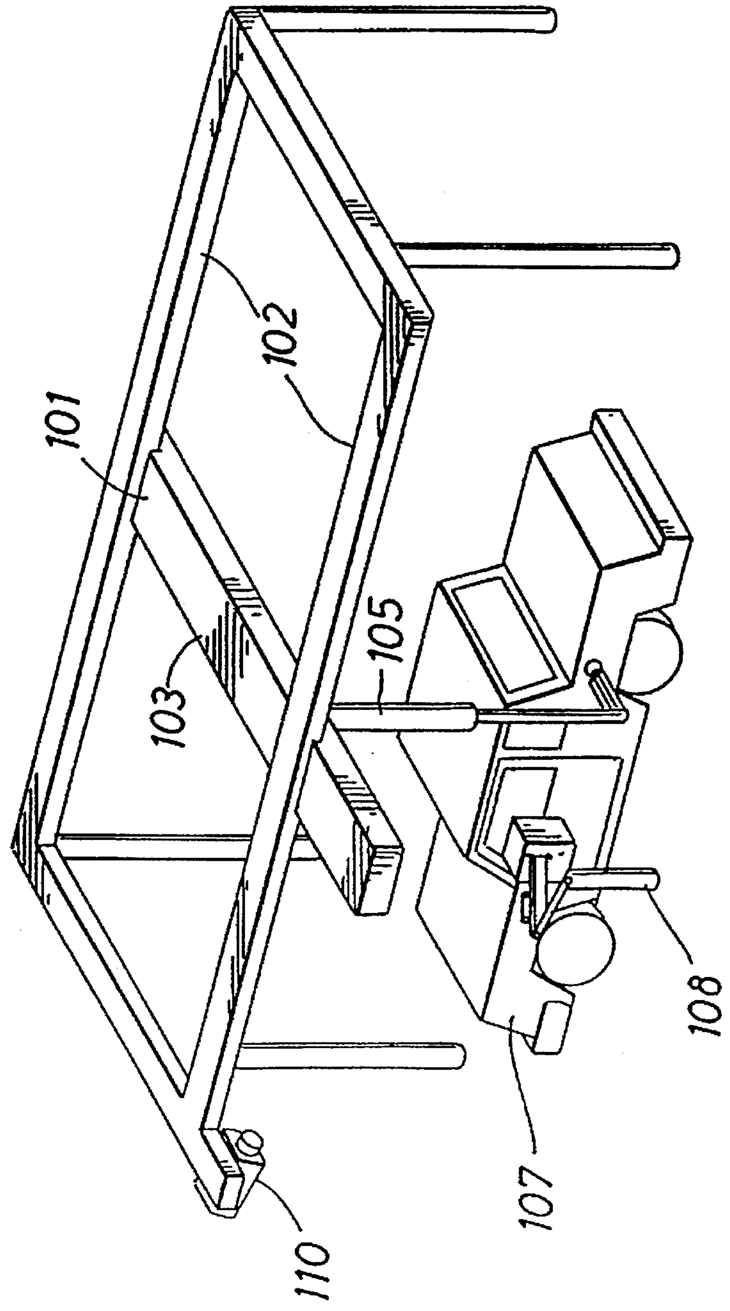
FIG. 1 shows a perspective view of the general arrangement of a preferred refuelling system including a customer interface of the present invention.

Referring now to FIG. 1, the general arrangement of components of a vehicle refuelling system according to a preferred embodiment of the present invention is shown. An overhead gantry 101 with a set of longitudinal supports 102 and a cross member 103 is shown. This gantry can move a nozzle manipulator 105 to position the refuelling nozzle on either side, or the rear of a vehicle, according to the location of the fuel inlet.

The location of the fuel inlet can be determined from data obtained from a transponder card (not shown) preferably placed on a windshield of a vehicle to be refueled 107. The transponder card can be one of many commercially available, preferably passive, transponder systems. For example, Amtech, located in Dallas, Tex., offers a transponder card system called "INTELLA TAG" which cards sell for about twenty five U.S. dollars. They have a data capacity of 1408 bits, and operate on a radio frequency of 924 Mhz. Motorola Indala, of San Jose, Calif., produces a system of having a 64 bit capacity that is readable from about two feet. Cards cost about three U.S. dollars, and acceptable readers can be purchased for about 630 U.S. dollars. TIRIS, of Austin, Tex., also offers acceptable systems. Active transponders are also available that operate on watch-type batteries and have significantly greater range. Although active transponders are more expensive, they could be acceptable in the practice of the present invention.

Other means of determining the vehicle type and/or identification could be utilized other than a transponder. For example, an optical bar code could be provided on a sticker on a window, bumper or fender. Magnetic strips could also be provided to transmit this information, but the range from which a magnetic strip could be read is limited.

The transponder system of the present invention provides vehicle information to the automated refuelling system thereby allowing the system to determine the location of the fuel inlet on the vehicle. A customer interface 108 is provided that optionally includes a credit card reader (not shown). Use of the customer interface and credit card reader ensures that the refuelling operation is intentionally initiated by the customer and provides a confirmation that the authorized customer is receiving the refuelling service.

Positioning of the fuel supply nozzle adjacent to the fuel inlet is preferably accomplished by a position sensor located on the fuel supply nozzle. The position sensor determines the position of the fuel supply nozzle with relationship to the fuel supply inlet. This position sensor may be, for example, a magnetic flux determination, with a magnet located on either the fuel inlet, fuel cap or on the hinged lid over the fuel inlet, or a vision system with a visual pick-up located on the fuel supply nozzle with information from the visual pick-up processed by software capable of recognizing the outline of the fuel hinged cover or fuel cap, and most preferably, also the position of the hinged cover about its hinged axis.

If a vision system is utilized to identify the position of the fuel inlet, the vision system may also be used to identify the location of the fuel cap after the hinged cover is opened, and possibly to identify the license plate number of the vehicle, for example, as a security check.

The customer interface is preferably automatically movable in the vertical direction and laterally toward the vehicle so that the interface is easily accessible from the driver's side window without the driver having to open the vehicle door. Movement of the customer interface could be initiated by the automated refuelling system upon a vehicle coming to a stop in a position to be refuelled, and preferably, after a confirmation that the engine of the vehicle has been shutdown. Information obtained from the transponder system could dictate the best vertical height for the customer interface for the particular vehicle. The automated refuelling system also is preferably provided with a means to determine the location of the vehicle relative to the system, and this information can be used to determine the extent of lateral movement toward the vehicle for best placement of the customer interface.

A preferred method and apparatus to determine if the vehicle's engine is operating is disclosed in U.S. Patent No. (docket no. TH0629), incorporated herein by reference.

A simple range determination can alternatively be provided to determine the location of the vehicle relative to the customer interface. A preferred range determination is by an ultrasonic range finding system is available from Polaroid and cost only about fourteen U.S. dollars each. Preferably, such an ultrasonic system is provided to confirm that movement of the customer interface will not cause a collision with the vehicle.

Range finding sensors of the present invention could be, rather than ultrasonic, for example, radar or laser. Ultrasonic systems are presently preferred because they have acceptable sensitivity and are less expensive than currently available alternatives. An acceptable radar based range finding sensor has been recently developed by Lawrence Livermore Laboratories, and has been referred to as a micropower impulse radar, or MIR. This technology has been incorporated in commercial products and is both inexpensive and accurate.

The range finding sensor used to determine the lateral distance which the customer interface will be moved also determine if a side mirror or other part of the vehicle is in the way of the desired path of the customer interface. Such a range finding sensor would also prevent the customer interface from bumping a part of the driver, such as the driver's arm, extending out of the window of the vehicle.

The means to determine the position of the vehicle relative to the automated refuelling system may be, for example, a probe extended to an expected location of a tire, a series of pressure sensors under or in the surface on which the vehicle is located, a series of ultrasonic, radar, laser ranger finders or a vision system. The vision system is shown with a camera 110 positioned above the expected location of the vehicle looking down at the vehicle. The camera produces an image that is digitalized and communicated to a central processing unit (not shown) that can be a programmable logic controller or a computer. The central processing unit may be located in a convenient location, for example either in a building at the location of the automated refuelling system, or remotely. The central processing unit can determine from the data provided by the camera the location of the vehicle within the view of the camera. A vision system could also verify that the shape and, if a color camera is utilized, if the color of the vehicle matches the vehicle for which the transponder card is issued.

Automated refuelling will require that measures be taken to prevent overfilling of fuel tanks by the automated refuelling systems. A preferred method to prevent overfilling of fuel tanks includes use of a fuel shut-off mechanism disclosed in U.S. patent application Ser. No. 08/461,487, incorporated herein by reference.

Figure 2:
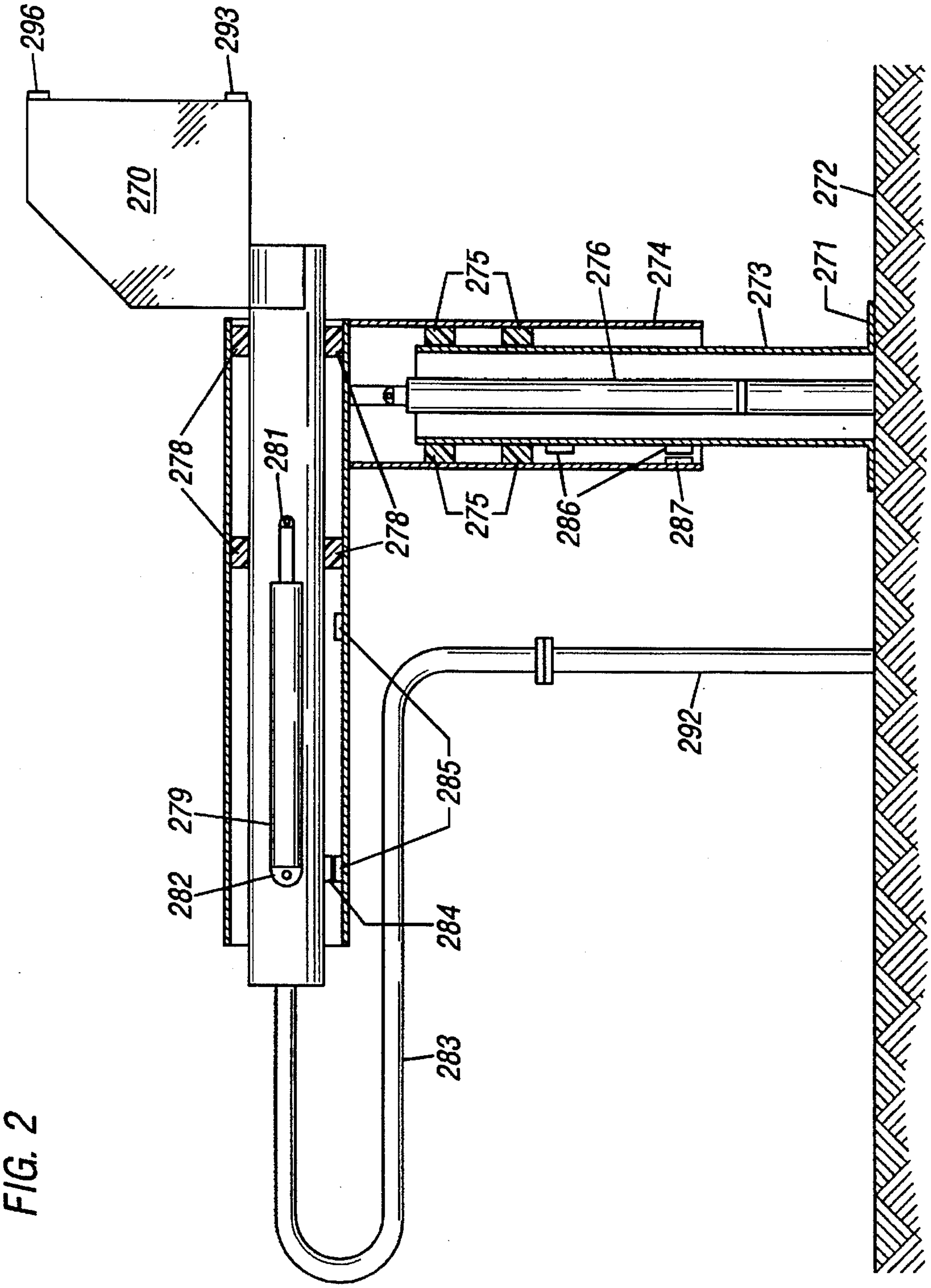
FIG. 2 shows a partial cut-away side view of a mechanism to position the customer interface of the present invention.

Referring now to FIG. 2, a partial cut-away side view of a preferred means for positioning a customer interface panel 270 is shown. The apparatus shown in FIG. 2 is simple, and can be of a small and nonobtrusive profile. Having a small and nonobtrusive profile is of significant importance in achieving customer acceptance, and also can be a significant factor in minimizing weight and cost.

A base plate 271 mounts the apparatus to a foundation of concrete 272 and supports a base stand 273. A vertically movable housing 274 slides on bearings 275 as urged by an air cylinder 276. Lateral movement toward a vehicle is provided by a laterally moving arm 277 that rides on bearings 278 within a horizontal housing section of the vertically movable housing 274. Horizontal air cylinder 279 (or pneumatic actuator) urges the laterally moving arm 277 outward toward the vehicle. Bracket 281 connects the horizontal air cylinder to the laterally moving arm 277. A stationary end of the horizontal air cylinder is fixed to the vertically moving housing by a fixed end bracket 282. A control and communication cable 283 is connected to the customer interface panel and is routed through the laterally moving arm and on to a control system (not shown). Horizontal position sensors 285 detect the presence of, for example, a magnet 284 to determine the horizontal position of the customer interface. Vertical position sensors 286 detect the presence of a magnet 287 attached to the vertical air cylinder. The position sensors provide indications of air cylinder extension for feedback to a control system for movement of the customer interface. Two sensors, as shown in FIG. 2, is adequate for control when the customer interface is to be moved between fixed positions, such as vertically to either an elevation appropriate for a truck, or an elevation appropriate for a sedan. A range finding sensor (preferably an acoustic sensor) 293 located on the customer interface provides feed back for lateral positioning of the customer interface, with magnetic pick-up sensors controlling a maximum extension and a retracted position.

Air cylinders could be replaced by, for example, hydraulic actuators, but air cylinders are preferred because of the lower expense of the cylinders and supply conduits.

Figure 3:
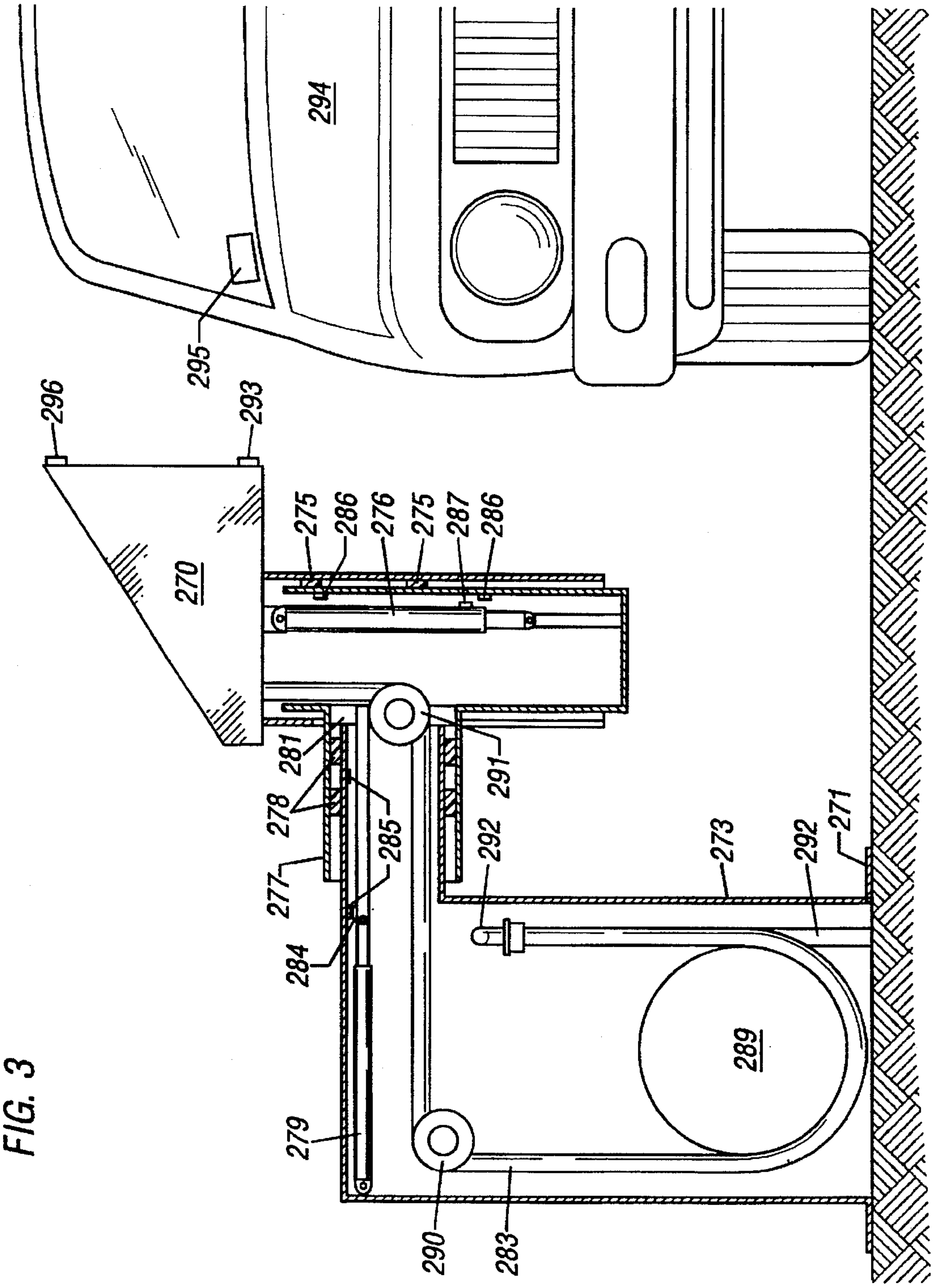
FIG. 3 shows a partical cut-away side view of another mechanism to position the customer interface of the present invention.

Referring now to FIG. 3, a partial cut-away side view of a preferred means for positioning a customer interface panel 270 is shown with like elements numbered as in FIG. 2. The apparatus shown in FIG. 3 is simple, and the size and weight of the vertically moving element is significantly smaller than the embodiment of FIG. 2. The smaller and lighter vertically moving element results in a smaller vertical air cylinder 276 being acceptable. This significantly reduces the cost of the apparatus and is therefore preferred.

An internal control conduit management is provided for in the embodiment of FIG. 3 by a vertical free-moving weighted pulley 289. The weighted pulley is weighted sufficiently to keep the control conduit tight without adding unnecessary stress to the control conduit. Fixed pulley 290 provides an acceptable radius for the control conduit to bend around for routing horizontally through the horizontal extension portion of the fixed base 273. A horizontally moving pulley 291 is fixed in the laterally moving element to provide an acceptable bending radius for the control conduits as the control conduit bends up the consumer interface. A system such as that shown in FIG. 3 therefore provides conduit management in the embodiment of FIG. 3. A conduit riser 292 can be a rigid conduit to provide a route for control conduits to above the weighted pulley.

Vehicle 294 is shown with a transponder card 295 placed in the windshield within view of a transponder card reader 296 located on the interface.

The means to position the customer interface panel within a predetermined lateral distance from the vehicle could alternatively be hinged arms that scissor horizontally from a hinge point to move the customer interface panel out toward a vehicle.

A preferred fuel distribution head for use with an automated refuelling method and apparatus according to the present invention is disclosed in U.S. patent application Ser. No. (docket no. TH0572), incorporated herein by reference, and a preferred apparatus for maneuvering the fuel distribution head is disclosed in U.S. patent application No. (docket no. TH0573), incorporated herein by reference.

The foregoing descriptions and figures of the present invention are exemplary, and reference to the following claims is made to determine the full scope of the present invention.

We claim:

1. A customer interface comprising:

a customer interface panel;

a means to determine a desirable height for the customer to access the interface panel from that particular vehicle;

a means to position the customer interface panel at the desirable height for the customer in the particular vehicle; and a means to position the customer interface panel within a predetermined lateral distance from the vehicle;

wherein the means to determine a desirable height for the customer to access the interface panel from the particular vehicle comprises a radio frequency transponder located within the vehicle capable of transmitting data indicative of vehicle make, model and year.

2. The customer interface of claim 1 wherein the means to determine a desirable height for the customer interface further comprises a computer based index of desirable heights for different makes, models and years of vehicles.

3. The customer interface of claim 1 wherein the means to position the customer interface panel within a predetermined lateral distance from the vehicle comprises an acoustic range sensor located on the customer interface panel.

4. The customer interface of claim 1 wherein the means to position the customer interface panel at the desirable height for the customer in the particular vehicle comprises a telescoping base.

5. The customer interface of claim 1 wherein the predetermined lateral distance from the vehicle is between about one inch and about twelve inches.

6. The customer interface of claim 1 wherein the means to position the customer interface at the desirable height for the customer in the particular vehicle comprises a pneumatic actuator capable of moving the customer interface panel vertically.

7. The customer interface of claim 6 wherein the means to position the customer interface within a predetermined lateral distance from the vehicle comprises a pneumatic actuator capable of moving the customer interface panel laterally wherein the pneumatic actuator capable of moving the customer interface panel vertically is also moved laterally by the pneumatic actuator capable of moving the customer interface panel laterally.

8. The customer interface of claim 1 further comprising a means to contain a fixed length of flexible control conduit within the customer interface.

9. The customer interface of claim 8 wherein the means to contain a fixed length of flexible control conduit within the customer interface comprises a weighted pulley and at least one pulley to guide the flexible conduit through the customer interface as the interface panel is positioned at the desirable height and the predetermined lateral distance.

10. The customer interface of claim 9 wherein the means to position the customer interface at the desirable height for the customer in the particular vehicle comprises a pneumatic actuator capable of moving the customer interface panel vertically.

11. The customer interface of claim 10 wherein the means to position the customer interface within a predetermined lateral distance from the vehicle comprises a pneumatic actuator capable of moving the customer interface panel laterally wherein the pneumatic actuator capable of moving the customer interface panel vertically is also moved laterally by the pneumatic actuator capable of moving the customer interface panel laterally.

* * * * *